United States Patent Office 3,291,687
Patented Dec. 13, 1966

3,291,687
CATTLE DIPS
George Wilson Cranch, Nottingham, England, assignor to Boots Pure Drug Company Limited, Nottingham, England, a British company
No Drawing. Filed Aug. 12, 1964, Ser. No. 389,217
8 Claims. (Cl. 167—36)

This invention is for improvements in or relating to cattle dips of the type known in the art as miscible liquids.

It is now customary practice to treat cattle externally at regular intervals with a preparation containing one or more pesticides in order to control cattle ticks thereon. The treatment is generally effected by dipping the animals in a bath containing an aqueous composition of the pesticides. Such dipping baths are normally prepared by the diultion with water of a concentrated formulation of the active ingredient which may be either a dispersible powder or a miscible liquid.

A miscible liquid should contain as high a concentration of active ingredient as possible in order to keep to a minimum manufacturing, transport and storage costs, and also in order to keep the concentration of organic solvent in the final aqueous dipping bath as low as possible so as to minimise the danger of irritation to the cattle. An active ingredient concentration of at least 20% is considered a preferred minimum for commercial purposes.

A compound which has found some use for the control of cattle ticks is alpha-naphthyl N-methylcarbamate, but the lack of adequate solubility of this compound in those organic solvents suitable for use in cattle dips prevents its formulation as a miscible liquid, and only the dispersible powder type of formulation is possible. More recently, 2-cyclohexylphenyl N-methylcarbamate and 2-cyclopentylphenyl N-methylcarbamate have been shown to be particularly valuable for the control of cattle ticks. Whilst the solubility of these compounds in organic solvents suitable for use in cattle dips is slightly greater than that of alpha-naphthyl N-methylcarbamate, it is not possible to formulate these as miscible liquids at the preferred concentration of at least 20% by the use of organic solvents conventionally used by those skilled in the art to formulate miscible liquids suitable for the treatment of cattle.

The present invention is based on our discovery that by using high-boiling tar acids as solvent, miscible liquids containing 2-cyclohexylphenyl N-methylcarbamate or 2-cyclopentylphenyl N-methylcarbamate may be prepared in which the concentration of active ingredient is at least 20% w./v., which are stable during storage, even, in the cases of the preferred compositions hereinafter described, at low temperatures of the order of −5° C., and which produce on dilution with water aqueous emulsions entirely suitable for the treatment of cattle.

According to the present invention there are provided cattle dips in the form of miscible liquids which comprise as active ingredient 2-cyclohexylphenyl N-methylcarbamate or 2-cyclopentylphenyl N-methylcarbamate in association with an organic solvent system which consists wholly or partly of high boiling tar acids, and a sufficient quantity of one or more emulsifying agents to produce a stable emulsion on dilution with water.

The high boiling tar acids used in the solvent system of the compositions of the invention are the mixtures of high boiling phenols which are obtained mainly from the middle or carbolic oil fractions of coal tar distillation. From such fractions, distillers normally isolate phenol, the cresols and the xylenols; the high boiling mixture of phenols remaining after removal of the aforementioned simpler phenols is a well-known phenolic mixture of commerce normally sold under the name "high boiling tar acids." Such a mixture frequently has a boiling range of about 200–300° C. A particular mixture which we have found to give very satisfactory results in the cattle dips of the present invention is that sold by Coalite and Chemical Products Ltd., under the name "Coalite D.X.L. high boiling tar acids." This is a light amber coloured liquid, specific gravity 1.021 at 15° C., boiling range 230–280° C.

The miscible liquids of the invention may contain high boiling tar acids as the sole solvent, but in order to minimise the danger of irritation of the cattle, to reduce costs to a minimum and to permit adjustment of the specific gravity of the miscible liquid to as near to 1.0 as possible, it is preferable to include one or more water-immiscible organic liquid diluents. In such cases, the solvent system of the miscible liquid would be a solution of the high boiling tar acids in said organic liquid diluent or diluents. Provided that a sufficient concentration of the high boiling tar acids is employed to ensure solution of the required quantity of active ingredient, the choice of organic liquid diluent or diluents is wide. Such diluents, which should naturally be non-irritant to cattle, are preferably water-immiscible organic liquids with a specific gravity near to 1.0 and boiling above 200° C. They need not be, and normally would not be, good solvents for the active ingredients, as the solvent power of the complete solvent system is produced by the content of high boiling tar acids. Neutral coal tar oils are suitable, for example the mixture supplied by Coalite and Chemicals Ltd. with a specific gravity of 1.06 and a boiling range of 230–300° C. Paraffin oils with specific gravities near to 1.0 and boiling above about 200° C. are also suitable. For example, spindle oil may be used, specific gravity 0.86–0.92, boiling range about 315–380° C.

The solvent system of the miscible liquids of the invention should preferably contain at least 20% by volume of high boiling tar acids. However higher concentrations are necessary if miscible liquids, which contain a high concentration of active ingredient and are stable at low temperatures, are desired. We have found that satisfactory results are obtained using a solvent system containing about 50–100% by volume of high boiling tar acids, the remainder, when present being spindle oil. We prefer to use a solvent system containing about 67% by volume of high boiling tar acids and about 33% by volume of spindle oil. Using neutral coal tar oils (as hereinbefore described) and spindle oil as organic liquid diluents, a suitable solvent system is one containing about 25–30% by volume of spindle oil, about 25–30% by volume of neutral coal tar oils, and about 40–50% by volume of high boiling tar acids. These solvent systems enable miscible liquids to be made containing 20% w./v. of 2-cyclohexylphenyl N-methylcarbamate or 2-cyclopentylphenyl N-methylcarbamate and a sufficient quantity of emulsifying agents to produce stable emulsions on dilution with water. These miscible liquids are stable at low temperatures of the order of −5° C., and on dilution with water produce very stable emulsions. The solvent system containing about 67% by volume of high boiling tar acids and about 33% by volume of spindle oil is preferred, as we have found that miscible liquids containing this system are more readily emulsified, particularly if the preferred type of emulsifying agents and adjuvants hereinafter described are used. It should be noted that the percentages of the various components quoted above represent the percentage concentration of each component based on the solvent system, and not the percentage concentration based on the total volume of miscible liquid.

Emulsifying agents used in miscible liquids are many, and extremely varied in chemical constitution. Any emulsifying agent or combination of two or more agents, which is capable of producing emulsions of the required stability when the miscible liquids are diluted with water, may be used in the miscible liquids of the invention. We have found that emulsifying agents vary tremendously in their effectiveness in satisfactory emulsifying a mixture of water and high boiling tar acids. Clearly it is not possible to state exactly which agents are and which are not suitable, in view of the fact that many hundreds of emulsifying agents are available and their suitability or otherwise can only be ascertained by trying each one of them over a range of concentrations. Work we have carried out indicates that particularly favourable results are obtained using a salt of an alkyl phenol ether sulphate and we prefer to use the agent marketed by Lankro Chemicals Ltd. under the name "Perlankrol P.A. conc.," which we understand to be an ammonium alkyl phenol ether sulphate. If more than one emulsifying agent is used, it is advantageous to employ one which favours the aqueous phase, e.g. an anionic agent in conjunction with one which favours the organic phase, e.g. a non-ionic agent. In the preferred compositions of the invention, we prefer to augment the emulsifying action of the Perlankrol P.A. conc. by the inclusion of sulphated castor oil and triethanolamine.

The concentration of emulsifying agent or agents will depend on a number of factors including the concentration of active ingredient, the nature of the emulsifying agent or agents, and the blend of solvent and diluents used as the solvent system. Sufficient emulsifying agent or agents must be employed to produce on dilution with water an aqueous emulsion which is capable of being kept with no agitation for a long period without completely separating out. In a miscible liquid according to the invention containing 20% w./v. of active ingredient, we have found that a concentration of about 10–15% w./v. (based on the total volume of the miscible liquid) of the aforementioned Perlankrol P.A. conc. gives satisfactory results, using one emulsifying agent only, particularly if the solvent system is the preferred system hereinbefore described. If auxiliary emulsifying agents are included, about 6–12% w./v. of Perlankrol P.A. conc. may be used, together with, for example about 2.5–7.5% w./v. of sulphated castor oil and about 2.5–7.5% w./v. of triethanolamine. In the preferred compositions of the invention, containing 20% w./v. of active ingredient, we prefer to use about 11% w./v. of Perlankrol P.A., about 5% of sulphated castor oil and about 5% of triethanolamine (based on the total volume of the miscible liquid).

According to a further feature of the invention there are provided aqueous compositions for the treatment of cattle to control cattle ticks which comprise emulsions containing as active ingredient 2-cyclohexylphenyl N-methylcarbamate or 2-cyclopentylphenyl N-methylcarbamate prepared by diluting with water the new cattle dips hereindescribed. In addition there is provided a method for protecting cattle from cattle ticks which comprises treating the cattle externally with aqueous compositions containing 2-cyclohexylphenyl N-methylcarbamate or 2-cyclopentylphenyl N-methylcarbamate, the compositions being prepared by diluting with water the new cattle dips hereindescribed.

The concentration of carbamate in the diluted dipping bath will depend on a number of factors including the size of the dipping bath, the number of animals to be dipped, the technique chosen for topping-up, etc., but will normally be 0.01–0.5%, preferably about 0.05–0.1%.

The following non-limitative examples illustrate the invention.

*Example 1*

A miscible liquid was prepared containing the following ingredients:

| | Percent w./v. |
|---|---|
| 2-cyclohexylphenyl N-methylcarbamate or 2-cyclopentylphenyl N-methylcarbamate | 20 |
| Perlankrol P.A. conc. | 12.5 |
| Spindle oil | 20 |
| Tar oil/tar acid blend 50%–high boiling tar acids D.X.L. 50% to 100% vol. | |

[The tar oil/tar acid blend consisted of 25% high boiling tar acids D.X.L. and 75% of neutral coal tar oils, specific gravity 1.06, boiling range 230–300° C., and was supplied by Coalite and Chemicals Ltd. (S. 1096A)].

The miscible liquid had a specific gravity of 1.028, and on dilution with water at the rate of 1 gallon to 200 gallons, produced a stable aqueous emulsion containing 0.1% w./v. active ingredient suitable for dipping cattle. The miscible liquid was completely stable on storage, even at −7° C.

*Example 2*

A miscible liquid was prepared containing the following ingredients:

| | Percent w./v. |
|---|---|
| 2-cyclohexylphenyl N-methylcarbamate or 2-cyclopentylphenyl N-methylcarbamate | 20 |
| Perlankrol P.A. conc. | 12.5 |
| High boiling tar acids D.X.L. to 100% vol. | |

*Example 3*

A miscible liquid was prepared containing the following ingredients:

| | Percent w./v. |
|---|---|
| 2-cyclohexylphenyl N-methylcarbamate or 2-cyclopentylphenyl N-methylcarbamate | 20 |
| Perlankrol P.A. conc. | 12.5 |
| Tar oil/tar acid blend (as described in Example 1) to 100% vol. | |

*Example 4*

A miscible liquid was prepared containing the following ingredients:

| | Percent w./v. |
|---|---|
| 2-cyclohexylphenyl N-methylcarbamate or 2-cyclopentylphenyl N-methylcarbamate | 20 |
| Perlankrol P.A. conc. | 6.5 |
| Ethylan MR (an ethoxylated octyl cresol) | 2.5 |
| Ethylan ME (cetyl oleyl ethoxylate) | 3.5 |
| Spindle oil | 20 |
| Tar oil/tar acid blend 50%–high boiling tar acids 50% to 100% vol. | |

*Example 5*

A miscible liquid was prepared containing the following ingredients:

| | Percent w./v. |
|---|---|
| 2-cyclohexylphenyl N-methylcarbamate or 2-cyclopentylphenyl N-methylcarbamate | 20 |
| Perlankrol P.A. | 6.2 |
| Ethylan MR | 3.8 |
| Ethylan ME | 5 |
| Sulphated castor oil, 70% | 5 |
| Triethanolamine | 3 |
| High boiling tar acids D.X.L. | 48 |
| Spindle oil to 100% vol. | |

This composition when diluted with water at the rate of 1 gallon to a total volume of 200 gallons produced a stable aqueous emulsion containing 0.1% w./v. of active ingredient suitable for dipping cattle.

Example 6

| | Percent w./v. |
|---|---|
| 2-cyclohexylphenyl N-methylcarbamate or 2-cyclopentylphenyl N-methylcarbamate | 20 |
| Perlankrol P.A. conc. | 15 |
| Sulphated castor oil, 70% | 5 |
| Triethanolamine | 5 |
| High boiling tar acids D.X.L. | 40 |
| Spindle oil to 100% vol. | |

I claim:

1. A composition adapted for producing a stable emulsion on dilution with water comprising (a) at least 20% w./v. based on the total volume of the composition of a carbamate selected from the group consisting of 2-cyclohexylphenyl N-methylcarbamate and 2-cyclopentylphenyl N-methylcarbamate, (b) a solvent system comprising 20–100% v./v. of high boiling coal tar acids which are the mixtures of high boiling phenols obtained from the carbolic oil fractions of coal tar distillation after prior removal of phenol, cresols and xylenols, said high boiling coal tar acids being further characterized by having a boiling range of about 200–300° C., and 80–0% v./v. of at least one water-immiscible organic liquid diluent having a boiling point above 200° C. and a specific gravity near to 1.0, and (c) at least one emulsifying agent in an amount sufficient to produce a stable aqueous emulsion when said composition is diluted with water to obtain a final concentration of 0.01–0.5% w./v. of carbamate.

2. A composition as claimed in claim 1 in which said solvent system comprises about 50–100% v./v. of said high boiling coal tar acids and about 50–0% v./v. of at least one water-immiscible organic liquid diluent selected from the group consisting of neutral coal tar oils and paraffin oils having boiling points about 200° C. and specific gravities near to 1.0.

3. A composition as claimed in claim 2 in which said solvent system comprises about 50–100% v./v. of said high boiling coal tar acids and about 50–0% v./v. of paraffin spindle oil having a boiling range of about 315–380° C. and a specific gravity of 0.86–0.92.

4. A composition as claimed in claim 3 in which said solvent system comprises about 67% v./v. of said high boiling coal tar acids and about 33% v./v. of paraffin spindle oil having a boiling range of about 315–380° C. and a specific gravity of 0.86–0.92.

5. A composition as claimed in claim 4 in which said high boiling coal tar acids have a boiling range of 230–280° C. and a specific gravity of 1.021.

6. A composition as claimed in claim 2 in which said solvent system comprises about 40–50% v./v. of said high boiling coal tar acids, about 25–30% v./v. of said neutral coal tar oils and about 25–30% v./v. of said paraffin oils.

7. A composition adapted for producing a stable emulsion on dilution with water comprising (a) about 20% w./v. based on the total volume of the composition of 2-cyclohexylphenyl N-methylcarbamate, (b) a solvent system comprising about 67% v./v. of high boiling coal tar acids which are the mixtures of high boiling phenols obtained from the carbolic oil fractions of coal tar distillation after prior removal of phenol, cresols and xylenols, said high boiling coal tar acids being further characterized by having a boiling range of about 200–300° C., and about 33% v./v. of paraffin spindle oil having a boiling range of about 315–380° C. and a specific gravity of 0.86–0.92, and (c) 6–15% w./v. based on the total volume of the composition of an ammonium alkylphenol ether sulphate emulsifying agent.

8. A composition as claimed in claim 7 which comprises 6–12% w./v. of an ammonium alkylphenol ether sulphate emulsifying agent and 2.5–7.5% w./v. of sulphated castor oil and 2.5–7.5% w./v. of triethanolamine as auxiliary emulsifying agents, the percentages being based on the total volume of the composition.

References Cited by the Examiner

UNITED STATES PATENTS

| | | | |
|---|---|---|---|
| 992,220 | 5/1911 | Little | 167—36 |
| 1,492,367 | 4/1924 | Franck-Philipson | 167—43 |
| 1,591,006 | 7/1926 | Alleman | 167—22 |
| 1,809,255 | 6/1931 | Soule | 167—29 |
| 1,882,618 | 10/1932 | Hyde | 167—29 |
| 1,981,123 | 11/1934 | Roche | 167—31 |
| 2,141,087 | 12/1938 | Martin | 167—43 |
| 2,228,407 | 1/1941 | Schuler et al. | 167—29 |
| 2,258,390 | 10/1941 | Martin | 167—43 |
| 2,269,336 | 1/1942 | Davies | 167—29 |
| 3,084,184 | 4/1963 | Hausweiler et al. | 260—479 |
| 3,179,557 | 4/1965 | Hausweiler et al. | 167—30 |

FOREIGN PATENTS

| | | |
|---|---|---|
| 928,177 | 6/1963 | Great Britain. |
| 952,801 | 3/1964 | Great Britain. |
| 982,235 | 2/1965 | Great Britain. |
| 987,254 | 3/1965 | Great Britain. |

OTHER REFERENCES

Sobell et al.: "Farm Uses for Coal-Tar Disinfectants," Soap and Sanit. Chem. 21 (2): 106–108, 111, 135 (1945).

Prased et al.: "The Properties of Producer-Gas Tars," Chemistry and Industry, pp. 652–653, Sept. 17, 1949.

LEWIS GOTTS, *Primary Examiner.*

SHEP K. ROSE, *Assistant Examiner.*